Aug. 26, 1969 M. R. EUVERARD 3,462,848
DRY COATING THICKNESS GAGE
Filed March 12, 1968 2 Sheets-Sheet 1
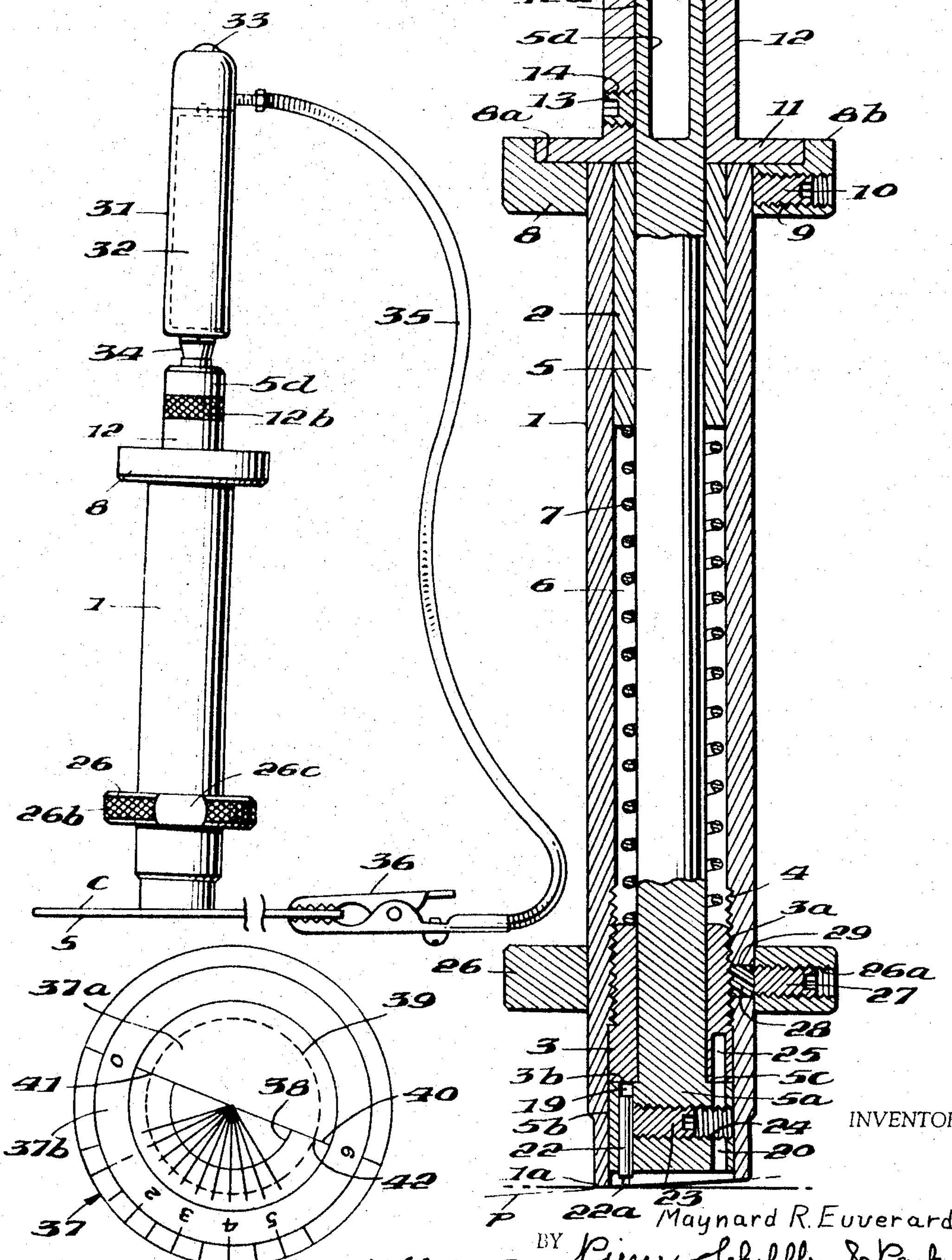
INVENTOR
Maynard R. Euverard
BY Pierce, Scheffler & Parker
ATTORNEYS DRY COATING THICKNESS GAGE
Filed March 12, 1968 2 Sheets-Sheet 2
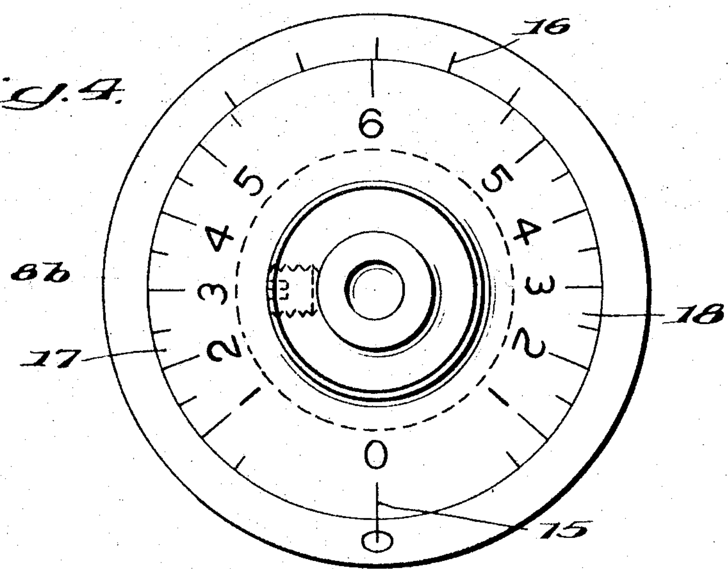
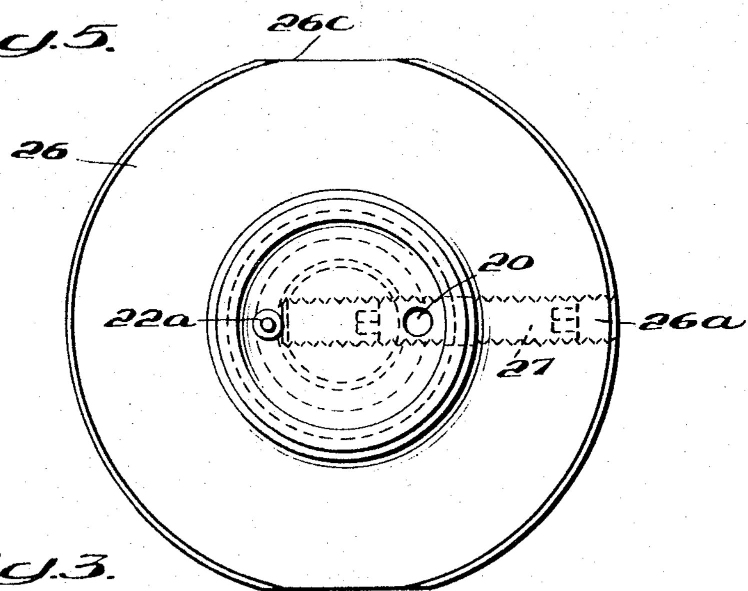
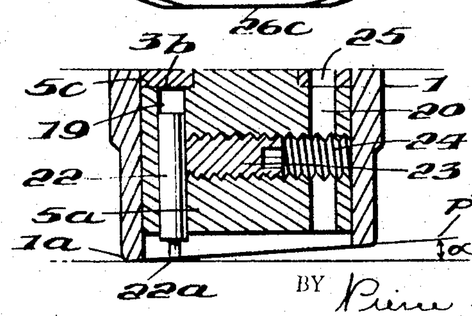
INVENTOR
Maynard R. Euverard
BY Pierce Scheffler & Parker
ATTORNEYS United States Patent Office 3,462,848
Patented Aug. 26, 1969

3,462,848
DRY COATING THICKNESS GAGE
Maynard R. Euverard, 305 De Soto Drive, Richmond, Va. 23229
Filed Mar. 12, 1968, Ser. No. 712,521
Int. Cl. G01b 3/22
U.S. Cl. 33—169 7 Claims

ABSTRACT OF THE DISCLOSURE

A dry coating thickness gage comprises a barrel having its lower end cut off at a slight angle to the barrel axis and a shaft supported within and co-axial with the barrel. A cutter element is secured to the lower end of the shaft and makes a progressively deeper arcuate cut into the coating as the shaft is rotated through 180° when the barrel is held with its lower end pressed firmly against the coating surface.

The present invention relates to an improved gage structure for measuring the thickness of dried coatings applied to any base such as dried coatings of paints, lacquers, varnishes and the like. Coatings applied to any base material such as wood, plastic, glass or metal can be measured provided the sub-strate underlying the coating is sufficiently rigid or can be supported so as not to be deformed by the pressure applied when taking a thickness measurement. Also, the thickness of unsupported films can be measured when placed on a suitable sub-strate for temporary support.

The gage has the additional advantage of being portable since it is of comparatively small size and weight and is adapted to be hand held when making a measurement. The gage can be used in most any position, is easy to use and is comparatively simple in construction. The gage has the additional advantage in that its readings are not adversely affected by non-uniform base characteristics so long as the latter is flat and rigid in the region in which the measurement is taken. Moreover, when multiple coats of differently colored materials have been applied to a base surface, it is possible to determine the thickness of each coat.

The gage in accordance with the invention operates on the so-called "scratch" principle, since gaging is accomplished by means of a cutter which scratches through the coating. To that extent, the present gage is similar to the gage construction as disclosed in my previously granted U.S. Patent No. 2,814,122 and to the gage construction as disclosed in my pending U.S. application Ser. No. 552,293 filed May 23, 1966 now Patent No. 3,423,837.

In the two gages referred to, the cutter element scratches through the coating to a pre-selected depth as determined by the gage setting as the gage is moved bodily over the coating. In the present construction, the gage body remains stationary and the cutter element starts from a position of zero coating thickness and makes a progressively deepening cut into the coating as the cutter element is moved along a predetermined path.

The improved gage can be used for a "Go No-Go" type of measurement for determining whether or not a minimum specified coating thickness has been applied to a base surface, in which case the cutter element will be advanced from its starting "zero" thickness point to the desired minimum which will be indicated on the gage. The gage is then removed and the scratch line inspected. If the end of the scratch line corresponding to the point of deepest penetration shows that the cutter element has not penetrated completely through the coating to the sub-strate, then one will know that the coating has at least the minimum thickness specified.

The gage can also be used to measure the actual thickness of the coating in which case the cutter will be advanced from its starting position to a point where the sub-strate is just exposed. The thickness of the coating is then read off the gage scale. If the sub-strate is electrically conductive, then the point of first contact as between the tip of the cutter and the surface of the sub-strate can be ascertained by means of an electrical indicator such as an ohmmeter or electrical circuit which includes a battery and a signal device such as a lamp which will be caused to light when the circuit is closed as the cutter point engages the sub-strate. If the sub-strate is not electrically conductive, the coating thickness can be determined visually by inspection of the scratch line with the help of a scale plate placed over the scratch line.

Another advantage of the improved construction is that the gage body itself does not move with respect to the surface of the coating in which the measurement is made. Thus there is no marring or discoloration of the coating surface.

A further advantage is that for any single measurement, the operating knob may be repeatedly rotated from zero to the desired thickness indication in order to assist the cutter in penetrating relatively hard coating materials. The cutter will always follow the same path as long as the gage body is not moved out of the position chosen for making the measurement.

Another advantage is that the calibration of the gage may be checked at any time and adjusted, if necessary.

Also, the gage may be produced in any desired range to meet specific requirements of coating thickness measurements.

The invention will be more clearly understood by reference to the following description of one suitable embodiment thereof and from the accompanying drawings wherein:

FIG. 1 is a view in elevation showing the gage in the position in which it is placed on the coated surface together with the electrical attachment which can be used;

FIG. 2 is a view in central vertical section of the gage minus the electrical detector component;

FIG. 3 is also a view in vertical section of the lower end of the gage, this view being drawn to a larger scale for purposes of clarity;

FIG. 4 is a top plan view of the gage minus the electrical detector drawn to a larger scale;

FIG. 5 is a bottom plan view of the gage drawn to the same scale as FIG. 4; and

FIG. 6 is a plan view of a circular scale plate useful in reading off the coating thickness from the scratch line made by the cutter.

With reference now to the drawings the gage structure includes a cylindrical barrel 1 preferably made from stainless steel. A bushing 2 preferably made from brass is located within the upper part of barrel 1 and a tubular adjusting sleeve 3 preferably made from brass is located within the lower part of the barrel. Adjusting sleeve 3 is provided with external threads *3a* which screw into an internally threaded portion 4 of the barrel. This adjusting sleeve, as will later be explained, enables one to adjust the gage to its zero position to compensate for wear on the cutter.

Extending through the upper bushing 2 and lower adjusting sleeve 3 is a cylindrical shaft 5 which preferably is made of brass, the shaft 5 being coaxial with the cylindrical barrel 1 and rotatable therein. Located within the annular space 6 between the lower end of bushing 2 and the upper end of adjusting sleeve 3 is a helical spring 7 which serves to load shaft 5 in an upward direction.

Located at the upper end of barrel 1 is a reference scale clamp in the form of an annular member 8 preferably made from aluminum, the inner diameter of which is essentially the same as the external diameter of barrel 1 in order to permit the clamp to be rotationally adjusted about the axis of the barrel. A threaded radial bore 9 extends through the wall of the clamp to accommodate an Allen screw 10 which serves to lock the clamp in a desired position to the barrel. The upper face of clamp 8 is provided with a cylindrical recess 8*a* which serves as a seat for the lower flange portion 11 of a tubular operating knob 12 preferably made from aluminum which fits upon the upper end of the operating shaft 5 and is secured to the latter by means of an Allen screw 13 which is threaded into a radial bore 14 in the cylindrical stem portion of the operating knob 12. The bore 12*a* in the operating knob has essentially the same diameter as the external diameter of shaft 5, and the thickness of flange 11 and its diameter are essentially the same as the depth of the recess 8*a* and its diameter, respectively so that the top of the flange will be flush with the upper surface 8*b* of the scale clamp and the periphery of the flange will be in close clearance with the wall of the recess.

As seen in FIG. 4, the upper surface 8*b* of the rim portion of scale clamp 8 is provided with a reference mark in the form of a line 15 on one side thereof and with a scale 16 of five equally spaced lines diametrally opposite for use in adjusting the gage to its proper zero indicating position.

The upper surface of flange 11 is provided with two oppositely disposed scales 17 and 18 each graduated from 1 to 6 mils. The two scales are identical and are provided so that one may obtain two readings from the same gaging position, i.e. one reading obtained by rotation of the operating knob 12 in a clockwise direction and another by rotating the knob in the counter-clockwise direction.

The lower portion 5*a* of shaft 5 has an enlarged diameter 5*b* slightly smaller than that of the bore within barrel 1 thus to establish an external shoulder portion 5*c* which abuts against the lower end face 3*b* of adjusting sleeve 3, and is held in such position by the force exerted upwardly by compression spring 7, the lower end of which bears against the upper end face of the adjusting sleeve.

The enlarged portion 5*a* of shaft 5 is seen to include two longitudinally extending bores 19, 20 which are disposed 180° apart. A cutter pin 22 made from any suitably hard cutting material such as carboloy and provided with a lower cutting edge 22*a* is inserted in bore 19 and held there by means of an Allen screw 23 threaded into a radial bore 24 which passes completely through the shaft part 5*a*. The other bore 20 is aligned with a longitudinal bore 25 formed in the lower portion of adjusting sleeve 3 for receiving a rod (not shown) by which the adjusting sleeve, when released, can be rotated to new positions from time to time, as may be required to readjust the cutting edge 22*a* of the cutter to a zero position.

Locking and release of adjusting sleeve 3 is obtained by means of a lower annular clamping ring 26 which surrounds the lower portion of barrel 1. The inner diameter of ring 26 is essentially the same as the exterior diameter of barrel 1 so as to provide a snug fit, and this ring is provided with a radial bore 26*a* in which an Allen screw 27 is threaded so as to lock-up the sleeve 3 in the desired position of adjustment longitudinally of the barrel by pressure exerted by the inner end of Allen screw 27 against a plastic pressure plug 28 slidably located within a transverse bore 29 in the wall of the barrel, the inner end of plug 28 bearing against the external threads 3*a* on adjusting sleeve 3.

The periphery of clamping ring 26 is knurled at 26*b* so as to enable it to be grasped more firmly by the fingers on one hand as a measurement is made with the gage, and is also provided with two oppositely disposed flats 26*c* to inhibit any undesired rolling when the gage is placed in a horizontal rest position on a supporting surface.

The lower end face 1*a* of barrel 1 is not squared off so as to lie perpendicular to the longitudinal axis of the barrel but rather is finished off at a slight angle $\alpha$ to that axis. In the present embodiment, in which the gage is designed to measure film thicknesses from 0 to 6 mils (0 to .006 inch), and wherein the edge 22*a* of cutter pin 22 rotates about the axis of barrel at a radial distance of 0.20, the lower end of the barrel will be accurately machined off at an angle of 0°52′ to the barrel axis. Thus when the gage is held in place in the proper attitude upon a surface S having a coating C whose thickness is to be measured, as indicated in FIG. 1, the longitudinal axis of barrel will not be vertical to the plane of the coating but rather will be located at a slight angle thereto as determined by the angle of cut-off at the bottom of barrel. Actually this angle has been exaggerated in FIG. 1 as well as in FIGS. 2 and 3 for purposes of illustration. Thus, as the lower cutting edge 22*a* of pin 22 is moved along an arcuate path around the axis of the barrel from a zero position as indicated in FIG. 2 flush with a plane P passed through the lower end face 1*a* of the barrel 1, the cutting edge 22*a* will be progressively lowered below that plane thus establishing a progressively deeper cut into the coating C along an arcuate path.

To facilitate measurement of the entire thickness of the coating in cases where the coating is applied to a base surface which is electrically conductive, an attachment in the form of an electrical indicator is provided. This attachment as shown in FIG. 1 includes a casing 31 containing a small dry battery cell 32, a lamp 33, a terminal plug 34 for insertion into a socket 5*d* at the upper end of shaft 5, and a flexible lead 35 which terminates in a spring clip 36 that is adapted to be attached to the sub-strate S. The circuit arrangement is such that when the end 22*a* of the cutter first makes contact with the sub-strate S, an electrical circuit is completed from one end terminal of the battery 32 through lamp 33, flexible lead 35, clip 36, sub-strate S, cutter pin 22, shaft 5 and plug 34 back to the other terminal of the battery thus causing the lamp to light. The coating thickness is then read off scale 17 or 18 depending upon the direction in which the shaft 5 is rotated by turning of the knob 12, knurled at 12*b*, with one hand while the other hand is used to hold the lower end of barrel 1 in firm contact with the coating S. If desired, two readings can be taken by rotating the knob 12 in both directions and averaging them.

When the gage is used for a "Go No-Go" type of measurement, wherein one desires to know only if the coating has a certain minimum thickness, for example 3 mils, the electrical indicator attachment can be removed. With the barrel of the gage held firmly in one hand in the position shown in FIG. 1, the knob 12 is rotated until the 3 mil mark on scale 17 or 18 reaches the reference line 15. The gage is then removed and the arcuate scratch made by the cutter examined. If the coating S is at least 3 mils thick, the sub-strate will not be exposed. If the coating is less than 3 mils thick, the sub-strate will be exposed thus showing that the coating does not come up to the minimum of 3 mils.

When the gage is used to measure the entire thickness of a coating which has been applied to a sub-strate which is not electrically conductive, one will utilize either of two modes of operation. For one mode of operation the gage is held against the surface of the coating as in FIG. 1 and knob 12 is rotated in one direction or the other until the graduation on scale 17 or 18 representing the expected thickness reaches the reference line 15. The gage is then removed from the surface and the arcuate scratch made by the cutter observed. This operation is repeated as necessary until a reading is obtained where the end of the arcuate scratch just exposes the sub-strate. A magnifier, such as a linen counter can be used to observe the scratch made by the cutter.

For the second mode of operation, knob 12 is rotated as before but is not stopped at the point of the expected thickness. Rather rotation is continued for the full range of the gage, i.e. in the present case to the 6 mil mark located 180° away from the 0 mark which will produce a semi-circular scratch graduated in depth from zero at one to 6 mils at the other.

A scale plate 37 as shown in FIG. 6 is then placed over the semicircular scratch 38 in order to enable one to read off the point along the scratch where the cutter element first exposed the sub-strate.

The scale plate 37 is constituted by a circular disc which can be made entirely of a transparent material, or as illustrated the plate may have a central portion 37*a* which is transparent, and an outer portion 37*b* which is opaque. The outer portion 37*b* includes an arcuate scale reading from 0 to 6 mils which is a duplicate of the scale on flange 11 of the operating knob 12 together with radial lines extending to the center of the disc. Also included on the disc is a circle 39 representing the circumference of barrel 1 the center of which coincides with the disc center and a diametral line 40 through the disc center and the 0 and 6 mil graduations on the scale. When the gage barrel is in the position shown in FIG. 1 two marks 41, 42 will be made on the surface of the coating C at diametrally opposite points at the circumference of barrel 1 before rotation of knob 12 is begun, one of these marks being in alignment with the 0 thickness position of cutter 22 and the other with the 6 mil thickness position. To enable these marks to be made, corresponding line marks are made 180° apart on the circumference of the barrel near the bottom thereof. After the semicircular scratch 38 has been made on the surface of the coating, the gage is removed, and scale plate 37 centered over the scratch in the position shown in FIG. 6, centering of the disc being achieved by locating the 180° displaced marks 41, 42 at opposite sides of the circle 39 and with the disc oriented such that diametral line 40 passes through the opposite ends of scratch 38. One then follows along scratch 38 with the eye until the point is reached where the sub-strate is first exposed by cut-through of the coating. The coating thickness is then read off on the scale with the help of the radial lines leading from the disc center out to the scale markings.

The gage should be checked at intervals, the frequency depending on the nature of its use, to ensure that it retains its original calibration. This can be done as follows: A film such as cellophane of known thickness is placed on a flat, electrically conductive surface, and one proceeds as previously described to measure its thickness utilizing the electrical indicator set-up as shown in FIG. 1. If the gage does not read the correct thickness of the cellophane film, it should be adjusted. If, for example, the gage reads the thickness of the cellophane film as 4 mils whereas its true thickness is 3 mils, the gage will, of course, be 1 mil off in its calibration. To re-calibrate the gage, the Allen screw 27 in lower clamp ring 26 is loosened thus releasing the pressure upon plug 28 which permits threaded sleeve 3 to be rotationally adjusted relative to barrel 1. A rod is inserted into bores 20 and 25 at the lower end of the shaft and sleeve respectively which have first been brought into alignment, and then the operating knob 12 is rotated thus rotating the shaft 5 and sleeve 3 as a unit in the proper direction until the required correction of 1 mil is achieved. Rotation of the knob 12 between two of the graduation marks 16, raises or lowers the cutter pin edge 22*a*, 1 mil. After the required degree of correction has been made, Allen screw 23 is tightened thus to re-lock the sleeve 3 in its recalibrated position, and the rod which had been inserted into the bores 20, 25 removed. A second measurement is then made of the thickness of the cellophane film in order to make certain the proper correction was made on the gage.

If desired, special gages can be made where the lower contacting face of barrel 1 is made from electrical insulating material. With such gages, the calibration can be checked as indicated above but without the use of a film of known thickness.

The gage which has been described can be made to different thickness ranges simply by changing the angle of cut-off at the bottom of barrel 1. The greater the angle of cut-off, the greater will be the thickness range. The range of the gage can also be changed by changing the distance of the cutter 22 with respect to the center of rotation of shaft 5. Also, the relatively rotatable scales 17 and reference mark 15 can be reversed, if desired, in which case scale 17 which is now carried by the flange 11 of operating knob 12 can be applied to the upper surface 8*b* of clamp 8, and the reference mark 15 which is now stationary, can be applied to the flange of operating knob 12.

Moreover, other modifications can be made in the construction and arrangement of the component parts of the gage without, however, departing from the spirit and scope of the inventive concept.

I claim:

1. A dry coating thickness gage comprising a barrel having the lower end thereof cut off at an angle to the barrel axis, a shaft mounted within said barrel and coaxial therewith for rotation about the barrel axis, a cutter pin having a lower cutting edge secured within the lower end of said shaft for rotation in a plane perpendicular to the barrel axis as said shaft is rotated thereby to make a progressively deeper arcuate cut into the coating when the lower end of the barrel is held in firm contact with the surface of the coating, and scale means for indicating the coating thickness as a function of the degree of rotation of said shaft and cutter pin from a zero position in which the cutting edge of said pin is flush with a plane passed through the lower end of said barrel.

2. A dry coating thickness gage as defined in claim 1 and which further includes a flanged operating knob secured to the upper end of said shaft for effecting shaft rotation, a bushing located in the upper part of the bore of said barrel, the upper end face of said bushing bearing against the flange on said operating knob and an externally threaded adjustable sleeve threadedly engaged with internal threading within the lower part of said barrel bore, said shaft being rotatably mounted within said bushing and sleeve and including a shouldered portion at the lower portion thereon in contact with the lower end face of said sleeve, and a helical spring located within the barrel bore in the annular space between the internal wall of said barrel and said shaft, the upper end of said spring bearing against the lower end face of said bushing and the lower end of said spring bearing against the upper end face of said sleeve thereby biasing said shaft in an upwards direction.

3. A dry coating thickness gage as defined in claim 2 and which further includes an annular scale clamp surrounding the upper portion of said barrel and detachably secured thereto, said scale clamp including a circular recess receiving said flange on said operating knob, and said scale means being applied to said flange and scale clamp.

4. A dry coating thickness gage as defined in claim 3 and which further includes a clamping ring surrounding said barrel, said clamping ring including a threaded radial bore having a screw therein pressing against a plastic plug located in a radial bore in the barrel wall, the pressure applied by said screw to said plug being transmitted by the plug against the threads on said adjustable sleeve to lock it in a selected position of adjustment within said barrel.

5. A dry coating thickness gage as defined in claim 4 wherein the lower portion of said shaft and the lower portion of said sleeve are provided with longitudinal bores adapted to be brought into alignment for temporary insertion of a rod which prevents relative rotation between said shaft and sleeve thereby enabling said sleeve to be vertically adjusted to re-calibrate the gage by rotating said shaft.

6. A dry coating thickness gage as defined in claim 1 wherein a flanged operating knob is secured to the upper end of said shaft for effecting shaft rotation, and said scale means is applied to said flange.

7. A dry coating thickness gage as defined in claim 1 wherein the upper end of said shaft includes a longitudinal bore constituting a socket for receiving an electrical conncetor plug of an electrical indicating device, said shaft and cutter pin being made of electrically conductive material thereby to provide an electrical indication when contact is established between the cutting edge of said cutter pin and an electrically conductive sub-strate to which the coating is applied.

References Cited

UNITED STATES PATENTS

| | | | |
|---|---|---|---|
| 1,961,764 | 6/1934 | Horstkotte ------ | 73—150 XR |
| 2,567,333 | 9/1951 | Gogan ---------- | 73—150 XR |
| 3,021,707 | 2/1962 | Haueisen ----------- | 73—150 |
| 3,340,615 | 9/1967 | Tooke ---------- | 33—169 XR |

LOUIS R. PRINCE, Primary Examiner

J. NOLTON, Assistant Examiner

U.S. Cl. X.R.

73—150